United States Patent
Amini et al.

(10) Patent No.: US 12,265,433 B2
(45) Date of Patent: Apr. 1, 2025

(54) COOLING HIGH MOTIONAL STATES IN ION TRAP QUANTUM COMPUTERS

(71) Applicant: IonQ, Inc., College Park, MD (US)

(72) Inventors: Jason Madjdi Amini, Takoma Park, MD (US); Kenneth Wright, Berwyn Heights, MD (US); Kristin Marie Beck, College Park, MD (US)

(73) Assignee: IonQ, Inc., College Park, MD (US)

( * ) Notice: Subject to any disclaimer, the term of this patent is extended or adjusted under 35 U.S.C. 154(b) by 952 days.

(21) Appl. No.: 17/357,323

(22) Filed: Jun. 24, 2021

(65) Prior Publication Data

US 2021/0406756 A1 Dec. 30, 2021

Related U.S. Application Data

(60) Provisional application No. 63/044,233, filed on Jun. 25, 2020.

(51) Int. Cl.
*G06F 1/20* (2006.01)
*G06N 7/01* (2023.01)
*G06N 10/40* (2022.01)

(52) U.S. Cl.
CPC .............. *G06F 1/206* (2013.01); *G06N 7/01* (2023.01); *G06N 10/40* (2022.01)

(58) Field of Classification Search
CPC .................................................... G06N 10/40
See application file for complete search history.

(56) References Cited

PUBLICATIONS

Allcock, D. T. C., et al. "Dark-resonance Doppler cooling and high fluorescence in trapped Ca-43 ions at intermediate magnetic field." New Journal of Physics 18.2 (2016): 023043. (Year: 2016).*
Che, H., et al. "Efficient Raman sideband cooling of trapped ions to their motional ground state." Physical Review A 96.1 (2017): 013417. (Year: 2017).*
Joshi, M. K., et al. "Population dynamics in sideband cooling of trapped ions outside the Lamb-Dicke regime." Physical Review A 99.1 (2019): 013423. (Year: 2019).*
Chen, J-S., et al. "Efficient-sideband-cooling protocol for long trapped-ion chains." Physical Review A 102.4 (2020): 043110. (Year: 2020).*

* cited by examiner

*Primary Examiner* — Eric Nilsson
(74) *Attorney, Agent, or Firm* — ARENTFOX SCHIFF LLP

(57) ABSTRACT

Aspects of the present disclosure describe techniques for cooling motional states in an ion trap for quantum computers. In an aspect, a method includes performing Doppler cooling and sideband cooling to sweep motional states associated with a motional mode to a zero motional state; applying a gate interaction on a red sideband; detecting, a population of non-zero motional states of the motional mode that remains after performing the Doppler cooling and the sideband cooling; and removing at least part of the population. In another aspect, a method includes performing a Doppler cooling; applying a gate interaction on a red sideband; detecting whether a population of non-zero motional states of the motional mode remains after performing the Doppler cooling; and redistributing the population of the non-zero motional states by Doppler cooling when a population is detected. A quantum information processing (QIP) system that performs these methods is also described.

20 Claims, 12 Drawing Sheets

COOLING HIGH MOTIONAL STATES IN ION TRAP QUANTUM COMPUTERS

CROSS REFERENCE TO RELATED APPLICATIONS

The present application claims priority to and the benefit of U.S. Provisional Patent Application No. 63/044,233, entitled "COOLING HIGH MOTIONAL STATES IN ION TRAP QUANTUM COMPUTERS," and filed on Jun. 25, 2020, the contents of which are incorporated herein by reference in their entirety.

BACKGROUND

Aspects of the present disclosure relate generally to cooling techniques used in quantum computers, and more specifically, to the cooling of high motional states in ion trap quantum computers.

The cooling of all the motional modes of a trapped ion chain, such as the one used in an ion trapped quantum computer or a quantum information processing (QIP) system, is necessary for reliable high fidelity qubit operations. The cooling process is usually implemented by coherently driving sideband transitions to remove motional excitations or phonons from each of these motional modes. However, sideband cooling can leave a population in high motional states in a motional mode. That population, even when small, can translate directly into fidelity loss.

It is therefore desirable to detect and remove that population of high motional states to improve the cooling process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a method for cooling motional states in an ion trap for quantum computers is described that includes performing Doppler cooling followed by sideband cooling to an ion in the ion trap to sweep population into non-zero motional states associated with a motional mode to a zero motional state; applying a gate interaction on a red sideband; detecting, in response to the application of the gate interaction on the red sideband, a population of non-zero motional states of the motional mode that remains after performing the Doppler cooling followed by the sideband cooling; and removing at least part of the population of non-zero motional states. As described in this disclosure, the term Doppler cooling may refer in some instances to a single Doppler cooling operation, and may also refer to more than one Doppler cooling operation where appropriate. Similarly, as described in this disclosure, the term sideband cooling may refer in some instances to a single sideband cooling operation and may also refer to more than one sideband cooling operation where appropriate.

In another aspect of this disclosure, another method for cooling motional states in an ion trap for quantum computers is described that includes detecting, for one or more motional modes in one or more ions in the ion trap, a population of non-zero motional states that remains after performing Doppler cooling, sideband cooling, and a gate interaction on a red sideband; and removing at least part of the population of non-zero motional states.

In yet another aspect of this disclosure, another method for cooling motional states in an ion trap for quantum computers is described that includes performing Doppler cooling on an ion or ions in the ion trap; applying a gate interaction on a red sideband; detecting, in response to the application of the gate interaction on the red sideband, whether a population of non-zero motional states of the motional mode remains after performing the Doppler cooling; redistributing the non-zero motional states by Doppler cooling in response to the population being detected; and applying sideband cooling to sweep the remaining motional population to a zero motional state.

In another aspect of this disclosure, a quantum information processing (QIP) system for cooling down one or more motional modes is described that includes an ion trap having one or more ions; an optical controller; an imaging system; and a cool down component. The cool down component is configured to perform, using the optical controller, Doppler cooling followed by sideband cooling to one or more ions in the ion trap to sweep population into non-zero motional states associated with a motional mode to a zero motional state; apply, using the optical controller, a gate interaction on a red sideband; detect, using the imaging system, in response to the application of the gate interaction on the red sideband, a population of non-zero motional states of the motional mode that remains after performing the Doppler cooling followed by the sideband cooling; and remove, using the optical controller, at least part of the population of non-zero motional states.

In yet another aspect of this disclosure, the cool down component of the QIP system may be alternatively configured to perform, using the optical controller, Doppler cooling on one or more ions in the ion trap; apply, using the optical controller, a gate interaction on a red sideband; detect, using the imaging system, in response to the application of the gate interaction on the red sideband, a population of non-zero motional states of the motional mode that remains after performing the Doppler cooling; and remove, using the optical controller, at least part of the population of non-zero motional states by applying sideband cooling to sweep at least a portion of non-zero motional states to a zero motional state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
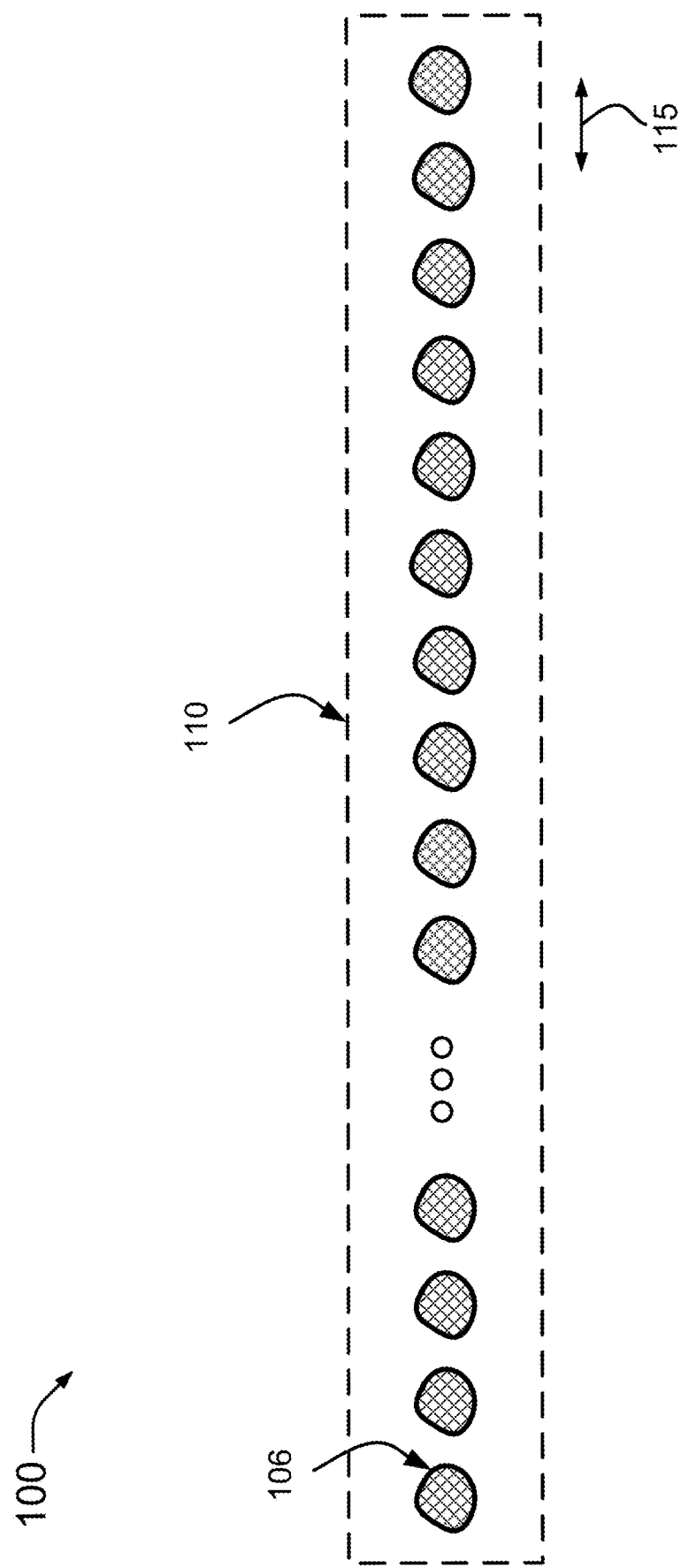
FIG. 1 is a diagram that illustrates an example of ions trapped in a linear or one-dimensional arrangement in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, the cooling of ions to a ground state of motion is critical for high fidelity quantum operations. Resolved sideband cooling (or simply sideband cooling) is a laser cooling technique used to cool trapped atoms or atomic ions to a quantum ground state of their motion. The atoms or atomic ions are generally cooled using the Doppler laser cooling (or Doppler cooling) and the sideband cooling is used to cool the atoms or atomic ions beyond the Doppler cooling limit. The sideband cooling essentially tries to bring the average motional occupation of a motional mode to zero but in doing so tends to leave a population behind in the non-zero motional states. Because of time considerations when performing the cooling process, a population of motional states is left behind with high n, where n is an integer number indicating a particular quanta or excitation state in a motional mode, and where n=0, 1, 2, . . . That is, due to time limitations, sideband cooling is designed to perform essentially a sweep of the population in motional states below a given threshold of n to n=0 ground state (e.g., a sweep of a large bulk of the population of motional states) and will potentially leave some population in high-n motional states behind (e.g., n≥10, n≥20, or n≥30). This population of high-n motional states can result in loss of fidelity (e.g., gate error) in the quantum operations. Due to various heating mechanisms, the total time that can be spent sideband cooling the ions is usually limited before the cooling becomes ineffective and so, often, increasing the threshold n does not significantly improve cooling. In addition, sweeping the high-n motional states is time consuming and the alternative approaches presented here may simply be faster.

An alternative approach, which this disclosure proposes, is to detect when the ions are in a bad state (e.g., have a population of high-n motional states) and then restart the cooling again in a way that will make it more likely for the cooling to be effective. That is, to address the issue of having a population of high-n motional states left after sideband cooling, a more effective approach may involve first detecting such population and, once detected, removing the population to eliminate the error caused by them in the quantum operations.

As an example, it may be the case that 1% of the time it is detected that a cooling process leaves a population behind of n≥20. In such a case, instead of sideband cooling, which is a very stepwise methodical process, Doppler cooling is performed that randomizes the motional states such that the average occupation is 10 ($\bar{n}$=10) and then a sideband cooling is performed again. Following such an approach it may be possible that 99% of the time it will result in a cooling down to a ground state, with only perhaps about 1% leftover after that. In other words, by detecting the high-n population of motional states, randomizing it to something that has a lower average n ($\bar{n}$) (e.g., Doppler cooling), and doing a normal clearing again (e.g., sideband cooling), it may be possible to lower the population of high-n motional states in that 1% of the time by simply using two sideband cooling steps. This may be more efficient than and faster on average than extending the sideband cooling to address the higher modes for every cooling cycle.

Accordingly, the present disclosure describes various techniques to remove the population of high-n motional states via a probabilistic detection of the high-n motional states using one or more ions in a chain of trapped ions. The probabilistic detection is intended to determine if a motional mode is in a zero motional state, a non-zero motional state, or some band of motional states. If a high motional state is detected, additional cooling can be triggered to remove the population in the high motional states or to probabilistically redistribute the motional states to lower motional states (e.g., lower average motional states). One sequence that can be used to implement such techniques can include the following operations: (1) Doppler and sideband cool the ion(s), (2) pump the ion(s) into the dark detection qubit state (or dark state), (3) apply a gate interaction on the "red" sideband (also referred to as a red sideband or red sideband gate), this has non-zero probability of causing a transition of the ion to the bright detection qubit state (or bright state) if the ion(s) is not in the motional ground state but little to no probability if the ion(s) are in the motional ground state, (4) detecting if the ions are in the bright state (if dark, the ions are not perturbed), (5) if bright, trigger further cooling, or, if dark, either continuing with the quantum computation or repeating the sequence starting from (3) to improve the detection of high-n motional states. The implementation of the transition associated with the red sideband may depend on the system and on various configurations, and may be different for different motional modes.

This sequence of clearing high motional states may be applicable to single ions and to two or more ions in a chain of ions. Moreover, the sequence may be applicable to a single motional mode or to multiple motional modes and in the latter case, the cooling of the multiple motional modes can be performed sequentially or in parallel. There may be some variations to the sequence described above, with additional details on the sequence and some variations described below in connection with FIGS. 1-12.

FIG. 1 shows a diagram 100 that illustrates multiple atomic ions 106 trapped in a linear or one-dimensional arrangement, e.g., a linear crystal or chain of ions 110. In some instances, the atomic ions 106 have a similar spacing 115 (e.g., about 5 microns or less). As used in this disclosure, the terms "atomic ions" and "ions" may be used interchangeably. The ions 106 may be trapped and configured into the chain 110 by using a linear radio frequency (RF) trap such as a linear RF Paul trap (the chain 100 can be inside a vacuum chamber not shown). In the example shown in FIG. 1, the trap may include electrodes for trapping multiple Ytterbium ions (e.g., $^{171}Yb^+$ ions) which are confined in the chain 110 and can be laser-cooled to be nearly at rest. Other atomic species may also be used such that various aspects of this disclosure need not be limited to Ytterbium ions. That is, the various methods, schemes, and systems described herein for cooling of high motional states in ion trap quantum computers need not be limited to the species and/or isotopes that are provided in this disclosure by way of example. The number of atomic ions trapped can be configurable and more or fewer atomic ions may be trapped than those shown in FIG. 1. In an example, the number of ions that may be trapped is M, where M>1 and where M is a number as large as 100 or even larger. In some examples, implementations having M=32 can be used but implementations with more or fewer trapped ions can also be used. The ions are illuminated with laser (optical) radiation tuned to a resonance in $^{171}Yb^+$ and the fluorescence of the ions may be imaged onto a camera or other detector. Fluorescence, or lack of fluorescence, to certain conditions may be used to detect the presence of high-n motional states. The various techniques described herein for cooling high motional states in ion trap quantum computers may be applied to a single ion 106 in the chain 110 or to multiple or all ions 106 in the chain 110.

In an ion-based QIP system (also referred to as a ion trapped QIP system or simply a QIP system), the ions are used to store quantum information in their qubit states and mediate the interactions between qubits of information through the coupled motional modes (also referred simply as motional modes). As discussed above, it is typically helpful to cool down the coupled motional modes of the ions to the ground state of motion to reduce errors in single and multi-qubit gates implemented using the ions (e.g., using ions 106 in the chain 110). These errors are caused by the dependence of those gates on the number of motional quanta in each motional mode. Motional quanta, or simply quanta, is a discrete quantity of energy proportional in magnitude to the motional frequency of the particular motional mode it represents. The particular number of motional quanta in a motional mode is called the motional state or mode state. As discussed above, n is an integer number (e.g., the motional mode number) indicating a particular number of motional quanta above the ground state energy for a particular mode. Cooling down the motional modes of the ions to the ground state of motion is equivalent to removing the motional quanta from each mode, i.e., reducing the n for each mode with the goal of bringing n to a value of 0.

Multiple techniques are usually combined to ground state cool any given motional mode. As discussed above, Doppler cooling is a common technique that is used for providing an initial or preliminary cooling of the motional modes. After Doppler cooling is performed, the number of motional quanta in each of the motional modes follows a probability distribution with decreasing probability as the number of the motional quanta increases.

Figure 2:
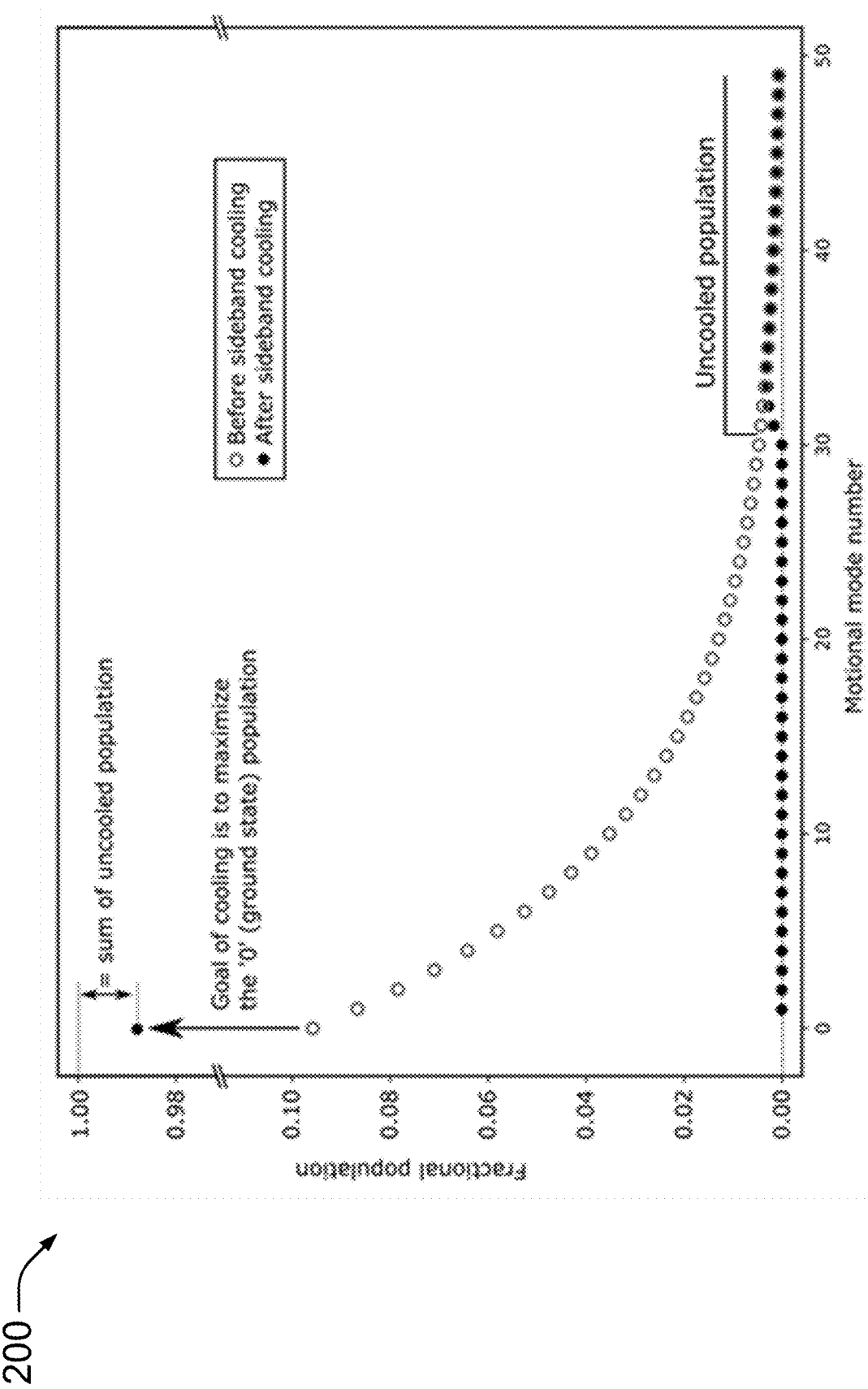
FIG. 2 is a diagram that illustrates an example of a probability distribution of motional states of an ion before and after sideband cooling in accordance with aspects of the disclosure.

FIG. 2 shows a diagram 200 that illustrates an example of a probability distribution of motional states of an ion before and after sideband cooling in accordance with aspects of the disclosure. As shown in the diagram 200, Doppler cooling produces a probability distribution (open circles) in which the lower n (motional mode number) motional states have larger fractional populations (e.g., are more likely to be present in the motional mode) and the higher-n motional states have smaller fractional populations (e.g., are less likely to be present in the motional mode). In this example, after Doppler cooling, the motional state at ground state, n=0, has a fractional probability of a little less than 0.1, with higher-n values having smaller fractional probabilities than that.

Doppler cooling is often followed by sideband cooling (solid circles) to increase the probability that a motional mode is in the ground state (e.g., the motional state is equal to 0 in FIG. 2). With this technique, the majority of initial motional modes states can be condensed into the ground state. In this example, the motional state at ground state, n=0, has a fractional probability greater than 0.98. The sideband cooling therefore tries to maximize the ground state population (n=0), as indicated by the arrow in the diagram 200, by essentially sweeping as many motional states into the ground state (with increasing fractional probability from about 0.1 to greater than 0.98), and leaving a large number of the motional states with zero or almost zero fractional probability (as shown by the range of motional states n=1 to approximately n=30).

Sideband cooling, however, can leave motional modes that start in high motional states relatively unaffected by the cooling because the sweeping performed by the sideband cooling does not explicitly address all high motional states. As a result, there can be an uncooled population of high motional states after sideband cooling. This is illustrated in FIG. 2 where the probability that a given motional mode is in the ground state is greatly improved by sideband cooling but there remains a probability that the motional mode will remain at a high motional state (e.g., the uncooled population with n≥30). If a chain of ions has a mode with a high motional state, a subsequent quantum computation using the ions will be perturbed, resulting in loss of fidelity for the quantum computation.

The present disclosure describes techniques to detect and handle the population of high motional states so that they do not cause a loss of fidelity for subsequent quantum computations. The term "red sideband" or "red sideband gate" as used in this disclosure refers to a motion-sensitive transition for the ion that takes the ion from a dark detection qubit state (dark state) to a bright detection qubit state (bright state) and which has a transition probability at or near zero for the ground motional state (n=0) and non-zero transition probability for some or all non-ground motional states (n>0). In other words, when the ion is pumped to the dark state and the motional state is the ground motional state a transition from the dark state to the bright state will not occur. When the ion is pumped to the dark state and the motional state is a state other than the ground motional state, a transition from the dark state to the bright state can occur but it is not guaranteed to occur. The use of the term "red" in the motion sensitive transition reflects a general nomenclature and does not reflect a particular implementation of the motion-sensitive transition.

Figure 3:
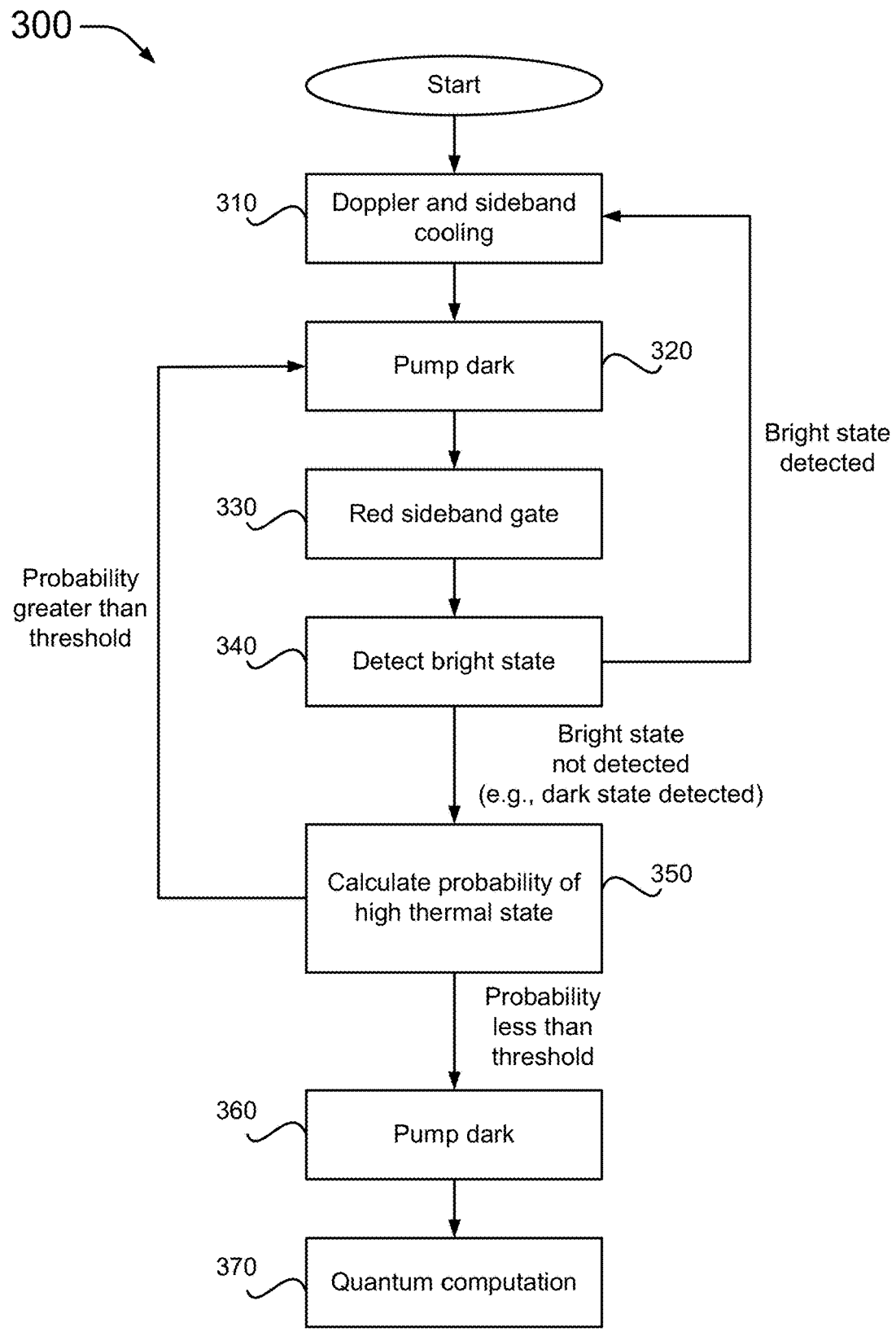
FIG. 3 is a process flow that illustrates an example of an implementation of a motional state clearing (e.g., removal of population of highly occupied motional states) in accordance with aspects of the disclosure.

FIG. 3 shows a process flow 300 that illustrates an example of an implementation of a motional state clearing (e.g., removal of population of high-n motional states). The process flow 300 is a general sequence of actions taken to detect and remove the high motional states. A high-level overview of the process flow 300 is that ion motion is detected using red sideband transitions followed by a state dependent fluorescence and, if the detection is positive for motion (e.g., a transition from dark detection qubit state to bright detection qubit state takes place), then the motion is re-initialized into a random motional state as in the probabilistic distribution in FIG. 2 using Doppler cooling. This approach can be repeated until motion is no longer detected, indicating that the sideband cooling likely worked efficiently and the motional mode is not in a high motional state.

Figure 4:
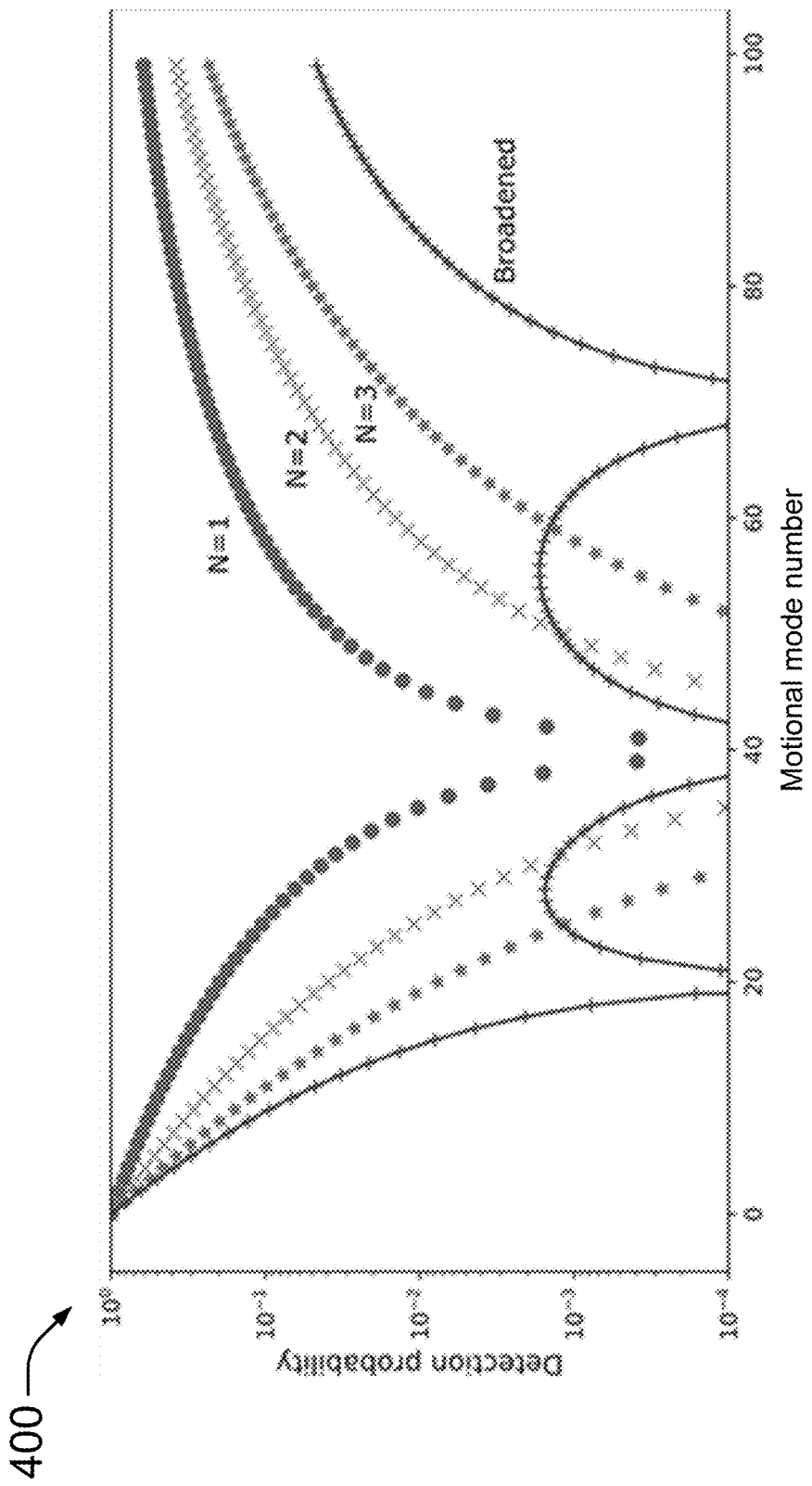
FIG. 4 is a diagram that illustrates the probability of detecting high motional states for the implementation of the motional state clearing of FIG. 3 in accordance with aspects of the disclosure.

The detection process associated with the process flow 300 can be tailored to detect the high motional states by choosing the parameters of the red sideband transitions to cause transitions in particular motional state ranges. For example, FIG. 4 shows a diagram 400 that illustrates the probability of detecting high motional states in the implementation given by the process flow 300 in FIG. 3. The horizontal axis of the diagram 400 is the motional state of the ion(s) as indicated by motional mode numbers ranging from n=0 (ground state) to n=100, where the diagram limit at n=100 does not indicate a limit on the possible mode numbers. The vertical axis of the diagram 400 is the probability of detecting that the ion(s) have motion if they are in that motional state, with the detection probability ranging from $10^{-4}$ to $10^0$ in this example. The N=1, 2, 3 curves correspond to one, two, and three cycles, respectively, of red sideband and detection loop in the process flow 300 in FIG. 3 (see e.g., red sideband gate 330 and detect bright state 340, which are described in more detail below) using a red sideband with parameters set to cause a 100% transition on the n=40 motional state. That is, the detection can be improved by configuring a desired level of sensitivity to a motional state through the use of multiple repetitions or cycles. In the diagram 400, the N=1 curve is depicted by circles, the N=2 curve is depicted by crosses, and the N=3 curve is depicted by stars. The "broadened" curve, which is depicted by a solid line with dashes, corresponds to three cycles of red sideband and detection loop where the red sideband parameters are set to induce a 100% transition on n=20 for the first cycle, on n=40 for the second cycle, and on n=70 for the third cycle. The use of these numbers of cycles and these particular red sideband parameters for each of these four curves is provided by way of example only and does not exclude other choices for number of cycles and/or the red sideband parameters.

The N=1 curve in FIG. 4 shows the efficiency of detecting the various motional states for a red sideband tuned to the 40 motional quanta (n=40). As an aspect of this disclosure, the process flow 300 can include the option of repeating the motion measurement for one or more times even if the prior measurement did not detect motion. The N=2 and N=3 curves in FIG. 4 show the probability of detecting motion after 2 and 3 iterations of the settings used in the N=1 curve. As an aspect of this disclosure, each of the iterations or cycles may use the same settings for the red sideband transitions or each of the iterations or cycles may use different settings for the red sideband transitions. For example, the "broadened" curve described above and shown in FIG. 4 iterates through three different settings for the red sideband transitions (e.g., n=20, n=40, and n=70) while the N=3 curve may iterate through the same three settings for red sideband transition (e.g., n=40, n=40, n=40). If none of the iterations detect motion, then the cooling process is considered to be a success. If any one of the iterations detects motion, then it is possible to loop back to Doppler cooling (FIG. 3) and repeat the process. As an aspect of this disclosure, it is possible to loop back to Doppler cooling at any point during the repeated iterations if motion is detected in which case all three measurements or iterations may not be necessary. As an aspect of this disclosure, it is possible to use different red sideband settings on each ion in a chain of ions.

Returning to FIG. 3, the process flow 300, which is used in connection with one or more number of cycles or iterations and/or the same or different red sideband parameters as described above, includes Doppler and sideband cooling 310 that provide an initial cooling of motional modes to maximize the ground state population (n=0) as illustrated in the diagram 200 in FIG. 2. In 320 of the process flow 300, ions are pumped to a dark detection qubit state (dark state). In 330 of the process flow 300, a red sideband transition is applied. As discussed above, a transition probability from the dark detection qubit state (or dark state) to a bright detection qubit state (or bright state) is at or near zero if the motional state is a ground motional state (n=0) (e.g., the transition will not happen), and there is non-zero transition probability for some or all non-ground motional states (n>0) (e.g., the transition can happen but it is not guaranteed to happen). When the red sideband gate pulse is turned on, all possible transitions, except for n=0, begin transitioning to the bright state, a rate dependent on n. At 340 of the process flow 300, detection of a bright state is performed. A bright state being detected is an indication of a transition from non-ground motional states because only non-ground motional states have a probability of transitioning while ground motional states have zero or near zero probability of transitioning to a bright state. Nevertheless, there may be cases in which non-ground motional states do not transition to a bright state in response to the application of a red sideband transition because, as indicated above, while such transition is possible only for non-ground motional states, the transition is not guaranteed.

Returning to 340, when a bright state is detected the process flow 300 may return to the Doppler and sideband cooling 310 to again try to maximize the ground state population by removing high-n motional states. When a bright state is not detected, that means that the ion remains in the dark state (e.g., it is not affected) and the detection process does not change the motional state of the ions. The process flow 300 may then proceed to 350 to calculate a probability of a high thermal state and compare the calculated probability with a threshold value. For example, it may be desirable to repeat the cycle (e.g., pump dark 320, red sideband gate 330, and detect bright state 340) if the probability of still being at a high n is larger than desired. The number of repetitions, however, may be limited as the time taken to perform these measurements might introduce excessive heating, which would affect the detection process.

When the probability of still having a high n is greater than or above the threshold value, the process flow 300 may return to the pump dark 320 to pump the ion again to a dark detection qubit state. When the probability of still having a high n is less than or below the threshold value, the process flow 300 may proceed to a pump dark 360 in which the ion is again pumped to a dark detection qubit state. Following 360, the process flow 300 may proceed to perform a quantum computation 370 with some or all high-n motional states removed to improve the fidelity of the quantum computation.

Figure 5:
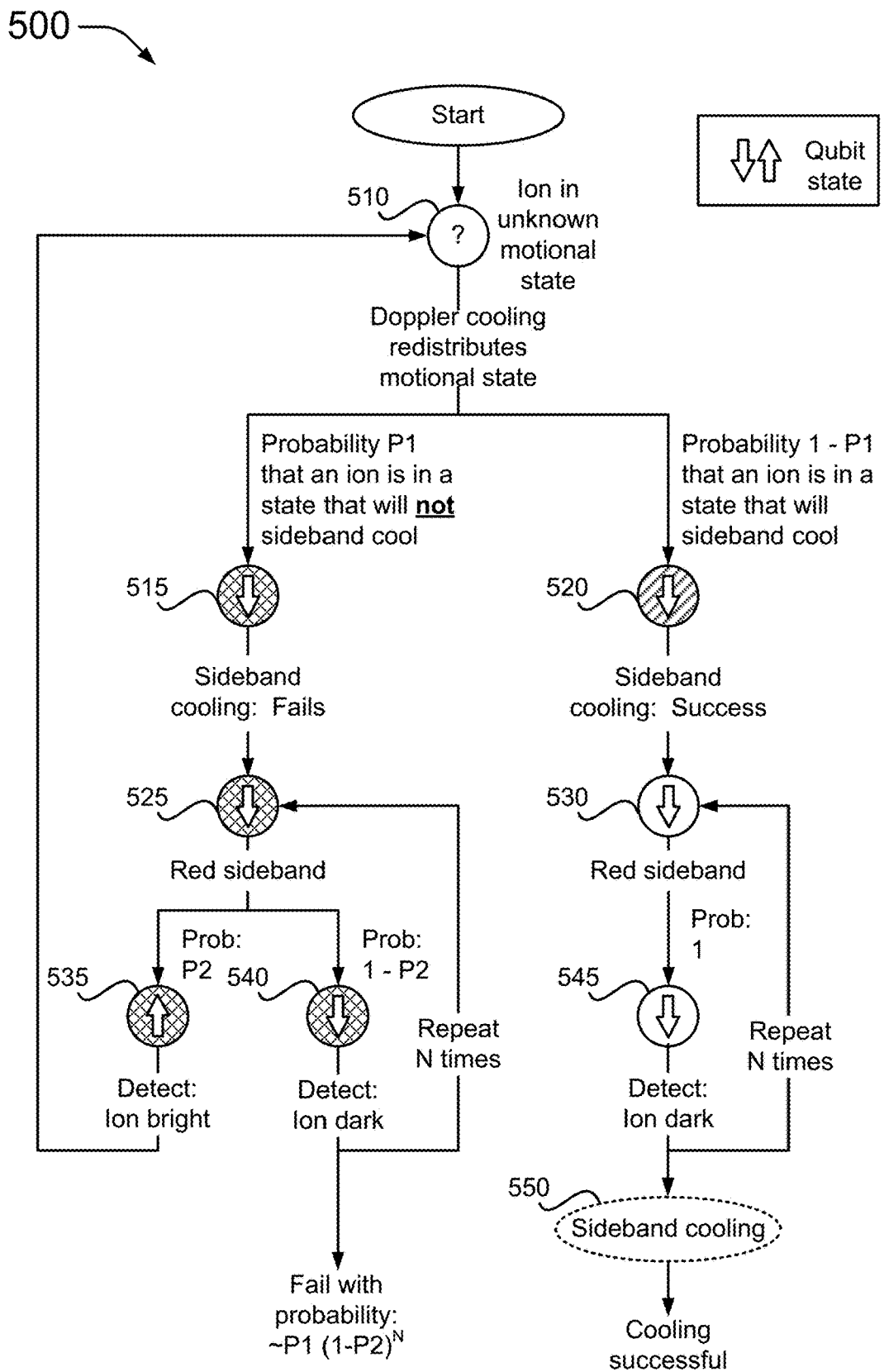
FIG. 5 is a diagram that illustrates an example of possible states of a single ion for the implementation of the motional state clearing of FIG. 3 in accordance with aspects of the disclosure.

FIG. 5 is a state diagram 500 that illustrates an example of possible states of a single ion for the implementation of the motional state clearing (e.g., removal of population of high-n motional states) of FIG. 3 for a single motional mode. A similar approach to one outlined in the state diagram 500 may be followed when multiple ions or multiple modes are involved. The ion starts in an unknown motional state at 510. Doppler cooling places the ion into a motional state according to a probability distribution, such as the example shown in the diagram 200 in FIG. 2. The ion may then have a probability (P1) that it will not sideband cool. That is, the motional state of the ion one that will not be swept into a ground motional state by sideband cooling. Thus, at 515, the sideband cooling applied to the ion after Doppler cooling fails to bring the ion to a ground motional state. This probability P1 may depend on the implementation of sideband cooling or other system parameters. Moreover, the ion may have a probability (1−P1) that is in a motional state that will sideband cool. That is, the motional state of the ion is one that will be swept into a ground motional state by sideband cooling. Thus, at 520, the sideband cooling applied to the ion after Doppler cooling succeeds in bringing the ion to a ground motional state.

With sideband cooling failing at 515 (e.g., sideband cooling did not cool the ion to the ground state), there is an uncooled population as shown in the diagram 200 in FIG. 2. The ion is then prepared in the "dark" detection qubit state (or dark state) of the state dependent fluorescence prior to the application of red sideband at 525. Since there is an uncooled population that includes non-ground motional states (n>0), there is a non-zero transition probability in connection with a red sideband transition. Accordingly, there is a probability (P2) at 535 that the ion will transition from the dark state to a bright state and a bright state will be detected in a subsequently state dependent fluorescence. The detection of a bright state is an indication of high n motional states and therefore 535 may be followed by a new Doppler cooling at 510 to again redistribute the motional states for additional clearing. Because the non-zero transition probability of the non-ground motional states (n>0) does not guarantee a transition, there is a probability (1−P2) at 540 that the ion will not transition from the dark state to a bright state and a dark state will be detected. The detection of a dark state is not a guarantee that there are no high n motional states and the red sideband of 525 may be repeated multiple times (e.g., N times), that is, the red sideband transition may be repeated with the same or different settings to improve the detection probability for the motional states. If 540 continues to detect a dark state for the ion, the cooling process is said to fail with a probability of approximately $P1 \cdot (1-P2)^N$, where N in this case is the number of repetitions from 540 back to 525.

With sideband cooling succeeding at 520, the ion is then prepared in the dark detection qubit state (or dark state) of the state dependent fluorescence prior to the application of red sideband at 530. Since the sideband cooling was successful and there is no uncooled population, the motional state is a ground motional state (n=0) that has zero red sideband transition probability. There is therefore a probability P=1 that the ion will not transition and a dark state will be detected at 545 in a subsequent state dependent fluorescence. The detection does nothing and the ion remains unperturbed. This result indicates that the ion is in the ground state and the overall cooling process was successful. Optionally, a final sideband cooling 550 may be applied after the dark state is detected and before the cooling process is deemed successful. The red sideband of 530 may be repeated multiple times (e.g., N times), that is, the red sideband transition may be repeated with the same or different settings to improve the detection probability for the motional states.

The methods described in this disclosure will also work, though with reduced efficiency, if the n=0 motional ground state has a non-zero probability of transitioning to a bright state when the red sideband is applied. If the n=0 motional state does transition to a bright state, the additional, unnecessary, Doppler cooling step(s) 510 will increase the average time to achieve a successful ground state cooling.

In a particular aspect of this disclosure, a chain of ions is Doppler cooled, sideband cooled, and then subject to red sideband interactions where the parameters for the interaction are independently tunable for each ion. The red sideband interaction on each ion is set to interact with a particular (unique or not unique) mode of motion through the tuning of the interaction frequency (as each motional mode has a characteristic frequency). The interaction time for each ion is individually set to optimize detection for the band or bands of motional modes desired. If any of the ions fluoresce during state detection (e.g., because of the presence of non-ground motional states (n>0)), Doppler cooling is triggered, redistributing all the motional states and the process repeats.

Additional variations to the techniques described above may include the following features. In one example, for one ion, the detection described above may be repeated on two or more of the ion's three motional modes. In another example, for two or more ions, all of the ions may be subject to a common or same red sideband transition used to detect a single motional mode of the two or more ions. In another example, for two or more ions, all of the ions may be subject to a common or same red sideband transition used to detect two or more modes of the two or more ions. In another example, for two or more ions, the ions are individually addressed and the red sideband transition on each ion is tuned to detect a particular motional mode or modes. In another example, the geometric configuration of the ions is not an equally-spaced linear chain and is instead, for example, in a non-equally spaced chain or a pair of linear chains that share common motion. In yet another example, for two or more ions, only a subset of the ions is subject to red sideband transitions. For two or more ions, the ions are not all the same ion species. In another example, for two or more ions, one or more of the ions are used to detect the motion in more than one motional mode. In another example, the motional detection may be performed before the sideband cooling. In this aspect, the high motional states may be redistributed to low motional states that are more efficiently cooled by the sideband cooling. In another example, the detection of a motional mode triggers a flagging of data from subsequent quantum computation (e.g., indicating that the fidelity of the quantum computation using the data may be compromised because of the presence of high motional states) instead of triggering Doppler cooling. Results from the quantum computation can then be removed or otherwise discarded during post-data processing subject to this flag. In yet another example, Doppler cooling is used only on a subset of the ions, such as the ions of a single species or a spatially-grouped subset of ions. In another example, a method other than Doppler cooling may be used to probabilistically or deterministically reduce the number of quanta in a motional mode. In another example, there may be instances in which the red sideband interaction is not perfect and has some probability of causing a transition from the ground state of motion. In such a case, the techniques described herein may be adapted to take into account the possibility of a transition from the ground state of motion. In another example, there may be instances in which the detection of the state dependent fluorescence is not perfect, introducing errors into the motion detection process. In such a case, the techniques described herein may be adapted to take into account errors in the detection process. In another example, the state detection may result in heating of the ions. The amount of heating may be state dependent. In yet another example, a state detection technique that is based on non-fluorescence instead of fluorescence may be used to perform the state detection (e.g., bright state or dark state) described in this disclosure. In yet another example, a state detection technique that only measures the states of some of the ions may be used.

In yet another variation, similar techniques to those applied in simultaneous cooling of motional modes may be combined with the techniques described herein. For example, simultaneous cooling techniques may be used in which a chain of ions is cooled to near the combined motional ground state that does not grow in execution time with the number of ions. By addressing each ion individually and using each ion to cool a different motional mode, it is possible to simultaneously cool multiple motional modes. In an example, it is possible to simultaneously cool one third of the total motional modes. In other examples, a different number of the total motional modes may be cooled. Such simultaneous cooling techniques may include a method for cooling of an ion chain having multiple ions by generating a sideband cooling laser beam for each ion in the ion chain, concurrently cooling two or more motional modes associated with the ions in the ion chain using the respective sideband cooling laser beam until each of the two or more motional modes reaches a motional ground state, and subsequently performing a quantum computation using the ion chain after the two or more motional modes have reached the motional ground state. There may also be a power broadening version of this simultaneous cooling techniques as applied to this disclosure. In such a case, multiple peaks may be placed at different locations to have multiple sensitive regions (see e.g., broadened curve in FIG. 4).

Figure 6:
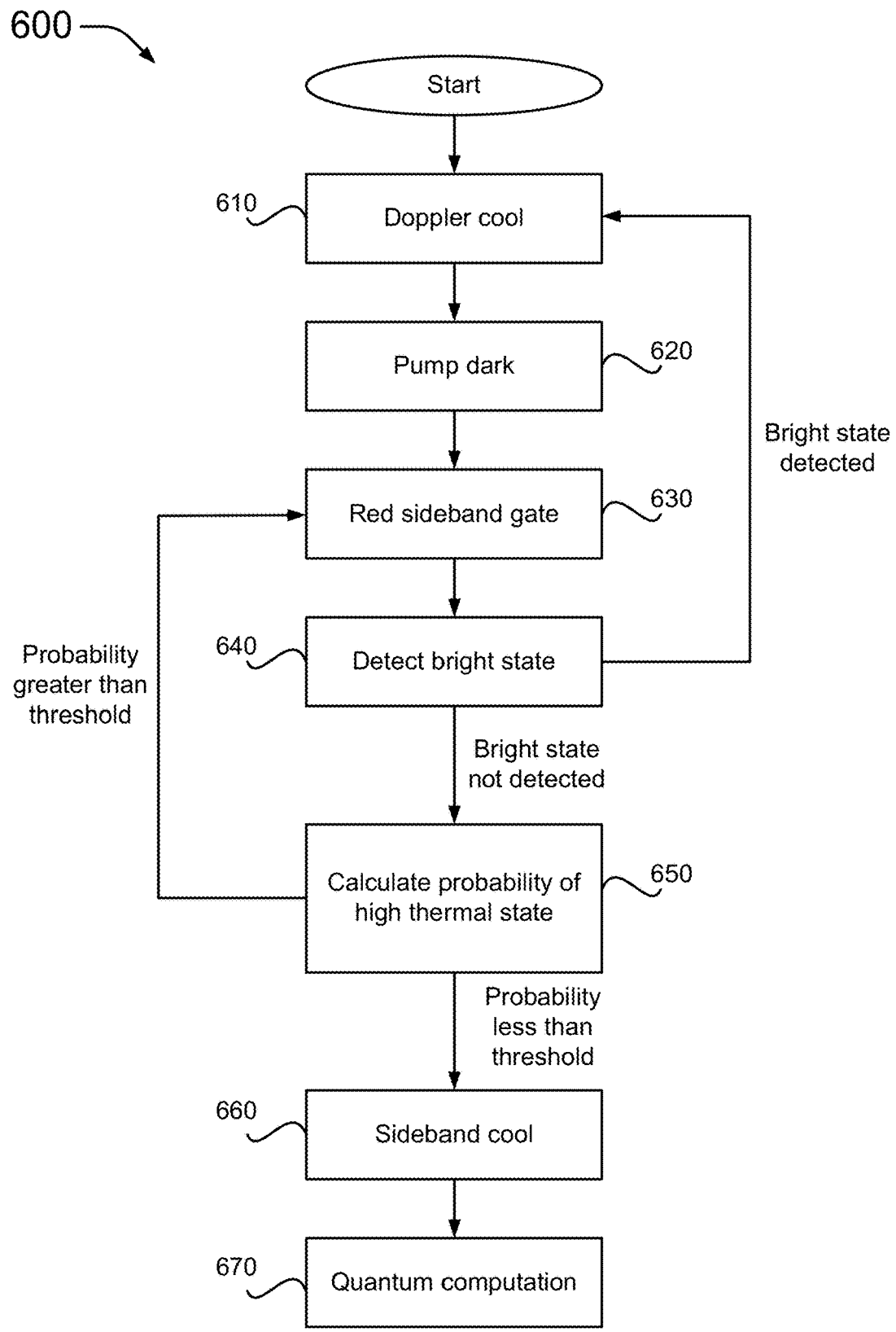
FIG. 6 is a process flow that illustrates another example of an implementation of a motional state clearing in accordance with aspects of the disclosure.

FIG. 6 is a process flow 600 that illustrates another example of an implementation of a motional state clearing (e.g., removal of population of high-n motional states). In this case, the process flow 600, which is used in connection with one or more number of cycles or iterations and/or the same or different red sideband parameters as described above in connection with the diagram 400 in FIG. 4, includes a Doppler cooling 610 (e.g., without sideband cooling) followed by a pump dark 620 in which an ion is pumped to a dark detection qubit state (dark state). In 630 of the process flow 600, a red sideband transition is applied. At 640 of the process flow 600, detection of a bright state is performed. When a bright state is detected the process flow 600 may return to the Doppler cooling 610. When a bright state is not detected, the process flow 600 may then proceed to 650 to calculate a probability of a high thermal state and compare the calculated probability with a threshold value.

When the probability of still having a high n is greater than or above the threshold value, the process flow 600 may return to the red sideband gate 630. When the probability of still having a high n is less than or below the threshold value, the process flow 600 may proceed to a sideband cool 660, which may then be followed by a quantum computation 670 with some or all high-n motional states removed to improve the fidelity of the quantum computation.

The approach described in connection with the process flow 600 may allow for a faster clearing than the approach described in connection with the process flow 300. For example, even if multiple Doppler coolings and/or multiple red sideband gate operations are performed in the process flow 600, having a single sideband cooling operation at the end may reduce the overall time of the clearing process compared to that of the process flow 300 given the length of time it takes to perform each sideband cooling operation. The sensitivity and/or efficiency of the different process flows may be different and consideration may be given to such issues when determining a process flow that is best suited for a particular system.

Aspects of the process flow 600 may be associated with the method for cooling motional states in an ion trap for quantum computers that includes performing Doppler cooling on an ion in the ion trap; applying a gate interaction on a red sideband; detecting, in response to the application of the gate interaction on the red sideband, a population of non-zero motional states of the motional mode that remains after performing the Doppler cooling; and removing at least part of the population of non-zero motional states by applying sideband cooling to sweep at least a portion of non-zero motional states to a zero motional state.

Figure 7:
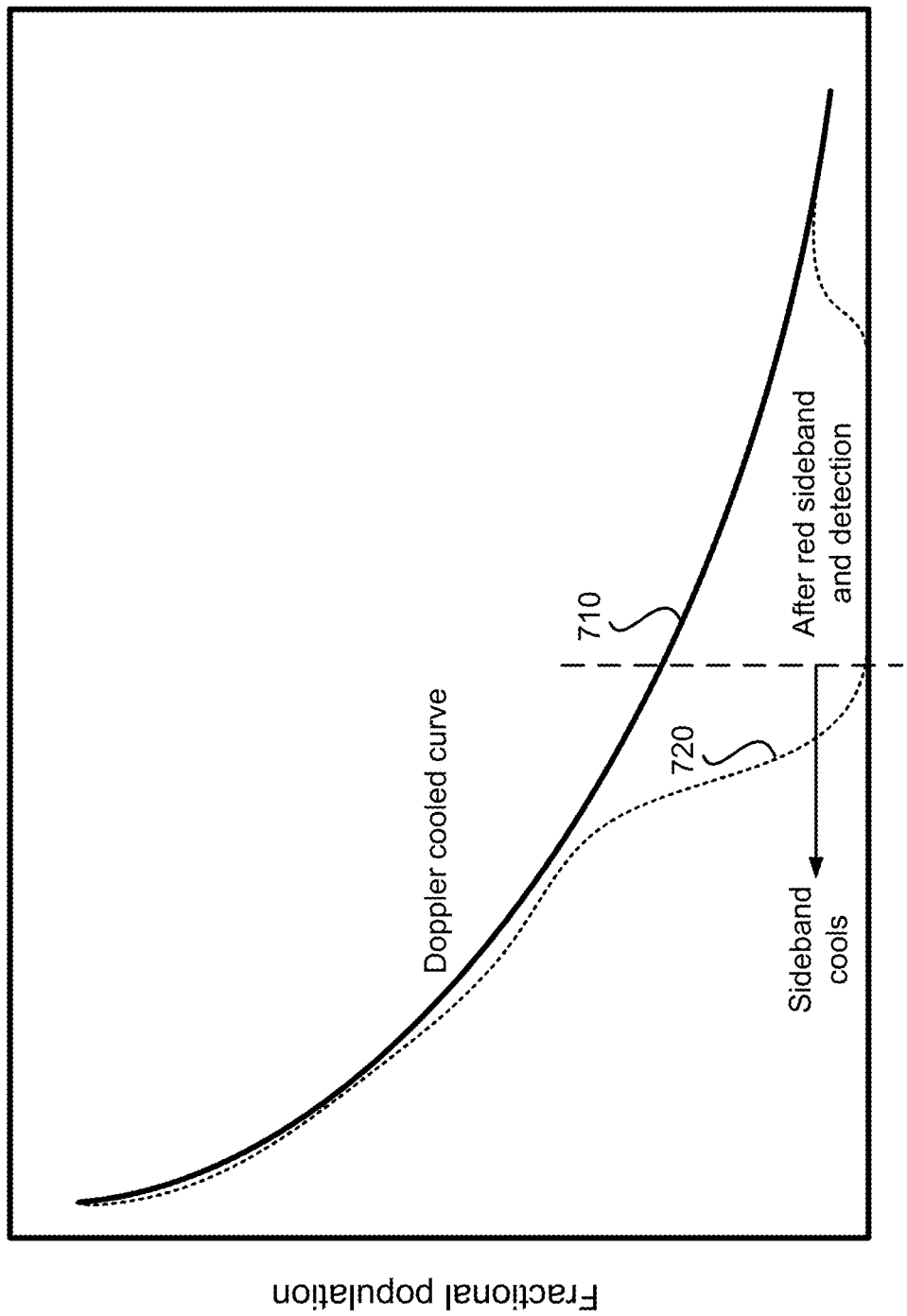
FIG. 7 is a diagram that illustrates an example of a probability distribution of motional states of an ion for the process flow in FIG. 6 in accordance with aspects of the disclosure.

Aspects of the process flow 600 may be associated with the cool down component of the QIP system that is configured to perform, using the optical controller, Doppler cooling on an ion in the ion trap; apply, using the optical controller, a gate interaction on a red sideband; detect, using the imaging system, in response to the application of the gate interaction on the red sideband, a population of non-zero motional states of the motional mode that remains after performing the Doppler cooling; and remove, using the optical controller, at least part of the population of non-zero motional states by applying sideband cooling to sweep at least a portion of non-zero motional states to a zero motional state FIG. 7 is a diagram 700 that illustrates an example of a probability distribution of motional states of an ion for the process flow 600 in FIG. 6. In this example, Doppler cooling is applied (e.g., Doppler cool 610) to produce a probability distribution curve 710. To the curve 710, one or more red sideband and detection cycles are applied (e.g., the red sideband gate 630 and the detect bright state 640) without detecting a bright side, resulting in a new probability distribution curve 720 in which the probability for motional states in a band are zero or near zero (e.g., the middle portion of the curve 720). Moreover, the application of the one or more red sideband and detection cycles increases the likelihood that the sideband cooling (e.g., the sideband cool 660) for the lower portion of the curve 720 is to be successful.

Figure 8:
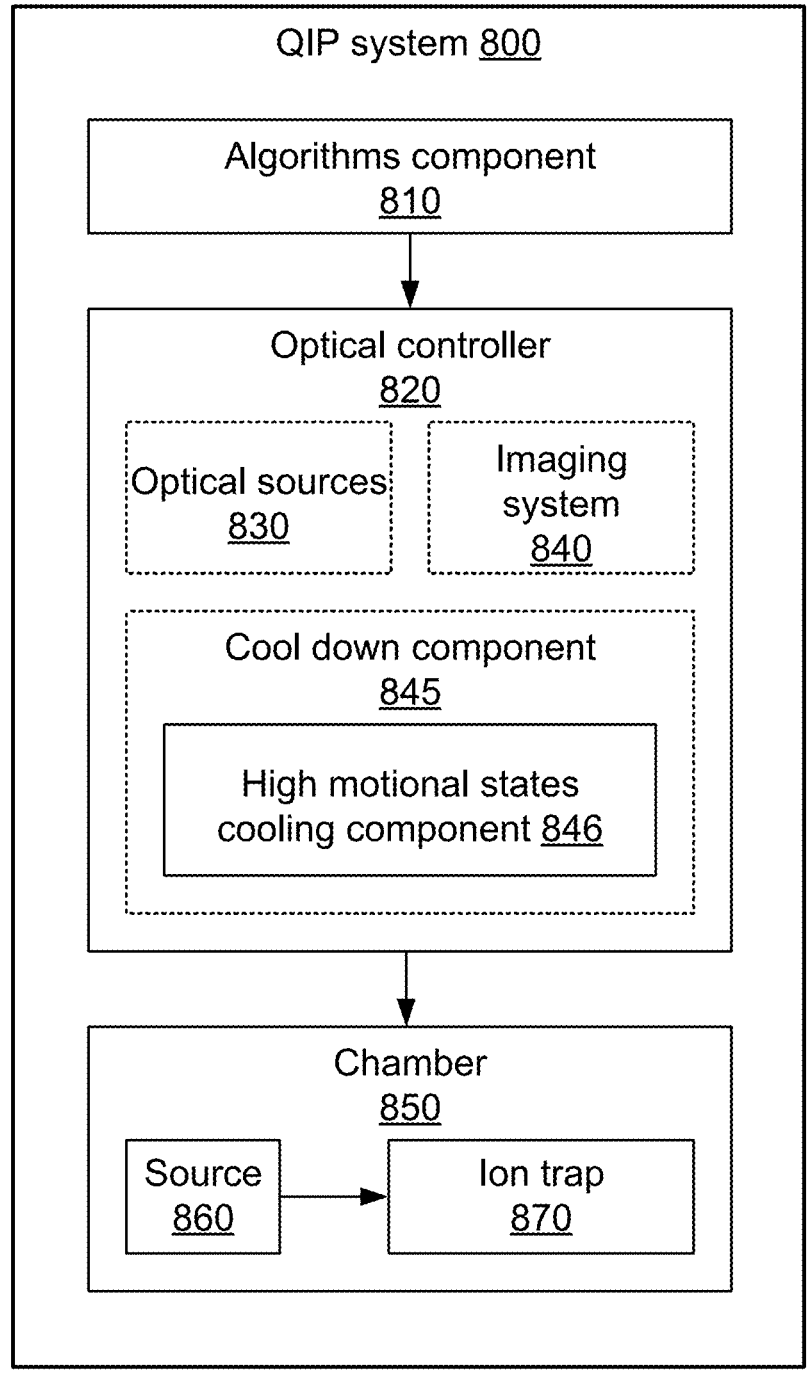
FIG. 8 is a block diagram illustrating an example of a quantum information processing (QIP) system in accordance with aspects of this disclosure.

FIG. 8 is a block diagram illustrating an example of a quantum information processing (QIP) system 800 in accordance with aspects of this disclosure. The QIP system 800 may also be referred to as a quantum computing system, a computer device, an ion trapped system, an ion trapped quantum computer, or the like. In an aspect, the QIP system 800 may be configured to perform quantum computations and quantum experiments. Moreover, the QIP system 800 may be configured to perform cooling of ions in a chain of ions to prepare the chain to be used as a processor or part of a processor. More specifically, the QIP system 800 may be configured to perform techniques that allow for cooling of high motional states in an ion trap for one or more motional modes. The length of the chain of ions may vary, that is, the number of ions (e.g., qubits) in the chain can be dynamically increased or decreased.

The QIP system 800 can include a source 860 that provides atomic species (e.g., a flux of neutral atoms) to a chamber 850 having an ion trap 870 that traps the atomic species once ionized. The ion trap 870 may be used to trap ions into a linear array such as the chain 110 described above in connection with the diagram 100 in FIG. 1. The ion trap 870 may be considered to be a trapped ion processor or part of one. Optical sources 830 in the optical controller 820 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 840 in the optical controller 820, and/or to perform the cool down functions described in this disclosure. The optical sources 830 may be configured to control and generate a linear array of laser beams to perform parallel operations on the ions of the chain in the ion trap 870. In an aspect, the optical sources 830 may be implemented separately from the optical controller 820.

The imaging system 840 can include a high resolution imager (e.g., CCD camera) for monitoring the atoms while they are being provided to the ion trap 870 and/or the atoms after they have been provided to the ion trap 870 and photoionized. In an aspect, the imaging system 840 can be implemented separately from the optical controller 820; however, the use of fluorescence to detect, identify, label, and/or control atomic ions using image processing algorithms may need to be coordinated with the optical controller 820.

The QIP system 800 may also include an algorithms component 810 that may operate with other parts of the QIP system 800 (not shown) to perform quantum algorithms or quantum operations, including a stack or sequence of combinations of single qubit operations and/or multi-qubit operations (e.g., two-qubit operations) as well as extended quantum computations. As such, the algorithms component 810 may provide instructions to various components of the QIP system 800 (e.g., to the optical controller 820) to enable the implementation of the quantum algorithms or quantum operations.

The optical controller 820 may include a cool down component 845 that is configured to control various aspects of a cool down operation. For example, the cool down component 845 may control various components of the QIP system 800 to perform different cool down techniques, including the process flows 300 and 600, the state diagram 500, and/or the methods 1000, 1100, and 1200 described below in connection with FIGS. 10-12. More specifically, the process flows 300 and 600, the state diagram 500, and/or the methods 1000, 1100, and 1200 may be implemented and controlled by a high motional states cooling component 846.

Figure 9:
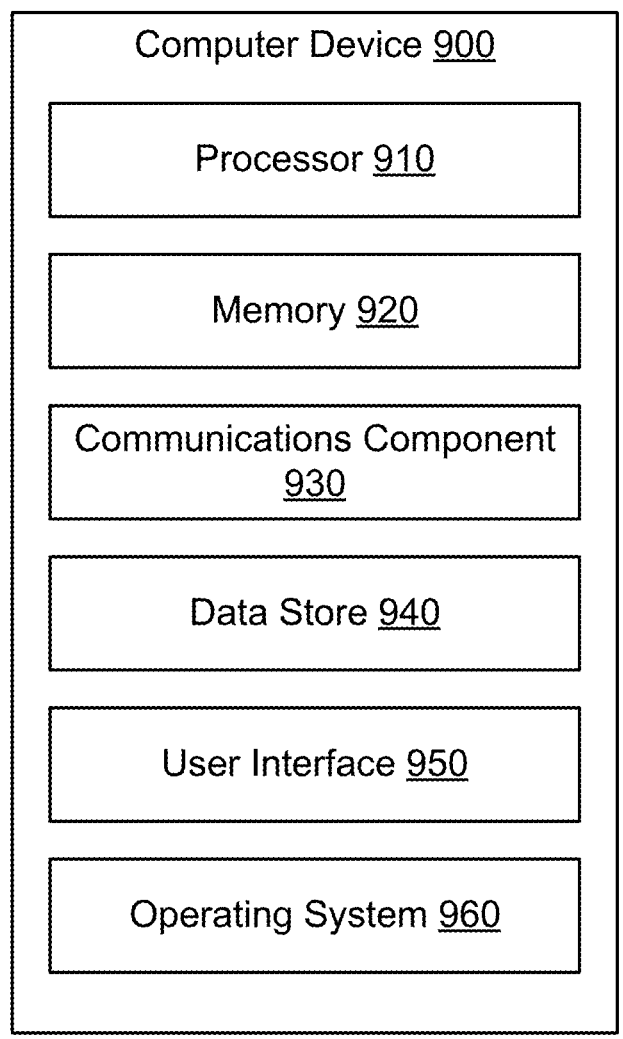
FIG. 9 is a block diagram illustrating an example of a computer device in accordance with aspects of this disclosure

Referring now to FIG. 9, illustrated is an example computer device 900 in accordance with aspects of the disclosure. The computer device 900 can represent a single computing device, multiple computing devices, or a distributed computing system, for example. The computer device 900 may be configured as a quantum computer (e.g., a QIP system), a classical computer, or a combination of quantum and classical computing functions. For example, the computer device 900 may be used to process information using quantum algorithms based on trapped ion technology and may therefore implement some of the techniques described for cooling of high motional states. A generic example of the computer device 900 as a QIP system that can implement the techniques described herein is illustrated in the example described above in connection with FIG. 8 and the QIP system 800.

In one example, the computer device 900 may include a processor 910 (e.g., a trapped ion processor) for carrying out processing functions associated with one or more of the features described herein. For example, the processor 910 may be configured to control, coordinate, and/or perform aspects of manipulating quantum information stored in an ion or atom. The processor 910 may include a single or multiple set of processors or multi-core processors. Moreover, the processor 910 may be implemented as an integrated processing system and/or a distributed processing system. The processor 910 may include a central processing unit (CPU), a quantum processing unit (QPU), a graphics processing unit (GPU), or combination of those types of processors. In one aspect, the processor 910 may refer to a general processor of the computer device 900, which may also include additional processors 910 to perform more specific functions. The processor 910 may involve using one or more trapped ions to perform quantum operations, algorithms, or simulations.

In an example, the computer device 900 may include a memory 920 for storing instructions executable by the processor 910 for carrying out the functions described herein. In an implementation, for example, the memory 920 may correspond to a computer-readable storage medium that stores code or instructions to perform one or more of the functions or operations described herein. In one example, the memory 920 may include instructions to perform aspects of methods 1000, 1100, and 1200 described below in connection with FIGS. 10-12, the process flow 300 of FIG. 3, the process flow 600 of FIG. 6, and/or the state diagram 500 of FIG. 5. Just like the processor 910, the memory 920 may refer to a general memory of the computer device 900, which may also include additional memories 920 to store instructions and/or data for more specific functions.

Further, the computer device 900 may include a communications component 930 that provides for establishing and maintaining communications with one or more parties utilizing hardware, software, and services as described herein. The communications component 930 may carry communications between components on the computer device 900, as well as between the computer device 900 and external devices, such as devices located across a communications network and/or devices serially or locally connected to computer device 900. For example, the communications component 930 may include one or more buses, and may further include transmit chain components and receive chain components associated with a transmitter and receiver, respectively, operable for interfacing with external devices, and in particular, with external quantum devices.

Additionally, the computer device 900 may include a data store 940, which can be any suitable combination of hardware and/or software, that provides for mass storage of information, databases, and programs employed in connection with implementations described herein. For example, the data store 940 may be a data repository for operating system 960 (e.g., classical OS, or quantum OS). In one implementation, the data store 940 may include the memory 920.

The computer device 900 may also include a user interface component 950 operable to receive inputs from a user of the computer device 900 and further operable to generate outputs for presentation to the user or to provide to a different system (directly or indirectly). The user interface component 950 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 950 may include one or more output devices, including but not limited to a display, a speaker, a haptic feedback mechanism, a printer, any other mechanism capable of presenting an output to a user, or any combination thereof.

In an implementation, the user interface component 950 may transmit and/or receive messages corresponding to the operation of the operating system 960. In addition, the processor 910 may execute the operating system 960 and/or applications or programs, and the memory 920 or the data store 940 may store them.

When the computer device 900 is implemented as part of a cloud-based infrastructure solution, the user interface component 950 may be used to allow a user of the cloud-based infrastructure solution to remotely interact with the computer device 900.

Figure 10:
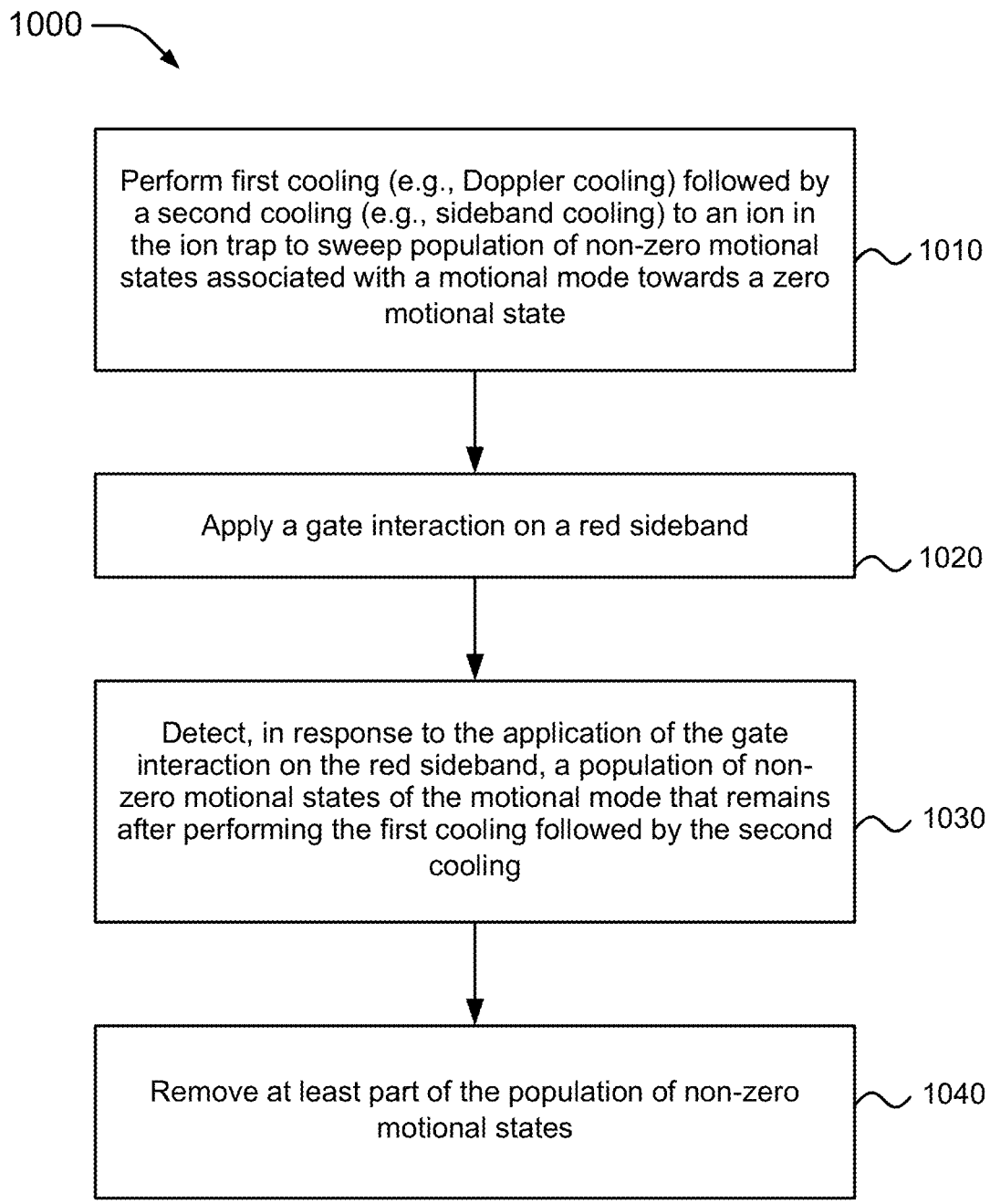
FIGS. 10-12 are flow diagrams that illustrate examples of methods in accordance with aspects of this disclosure

FIG. 10 is a flow diagram that illustrates a method 1000 for cooling motional states in an ion trap (e.g., the ion trap 870) for quantum computers. In an aspect, the functions of the method 1000 may be performed by one or more components of a trapped ion system or a QIP system such as the QIP system 800 and its components (e.g., optical controller 820 and its components or subcomponents). Similarly, the functions of the method 1000 may be performed by one or more components of a computer device such as the computer device 900 and its components.

At 1010, the method 1000 includes performing Doppler cooling followed by sideband cooling to an ion in the ion trap to sweep the population of motional states associated with a motional mode towards a zero motional state.

At 1020, the method 1000 includes applying a gate interaction on a red sideband.

At 1030, the method 1000 includes detecting, in response to the application of the gate interaction on the red sideband, a population of non-zero motional states of the motional mode that remains after performing the Doppler cooling followed by the sideband cooling.

At 1040, the method 1000 includes removing at least part of the population of non-zero motional states.

Alternatively, 1030 and 1040 may respectively include detecting, in response to the application of the gate interaction on the red sideband, whether a population of non-zero motional states of the motional mode remains after performing the Doppler cooling followed by the sideband cooling and removing at least part of the population of non-zero motional states in response to such population being detected.

In another aspect of the method 1000, the non-zero motional states include motional states with a motional mode number n. Non-limiting examples of the value of the motional mode number include n≥10, n≥20, n≥30, n≥40, or n≥50.

In another aspect of the method 1000, the method 1000 may also include pumping the ion into a dark state after performing Doppler cooling followed by sideband cooling, and where detecting the population of non-zero motional states of the motional mode includes detecting whether the ion remains in the dark state or transitioned to a bright state in response to the application of the gate interaction on the red sideband. The method 1000 may further include proceeding to a quantum computation in response to the dark state being detected, otherwise proceeding back to a subsequent Doppler cooling followed by a subsequent sideband cooling in response to the bright state being detected. Moreover, in response to the dark state being detected, the method 1000 may include determining a probability that the ion is at a high thermal state, and proceeding back to the pumping of the ion into the dark state in response to the probability being greater than a threshold, otherwise proceeding to use the ion in the quantum operation. Proceeding to use the ion in the quantum operation may include pumping the ion into the dark state prior to being used in the quantum operation.

In another aspect of the method 1000, a cycle or iteration may include the Doppler cooling and the sideband cooling, the pumping the ion into a dark state, the applying the gate interaction on the red sideband, and the detecting whether the ion remains in the dark state or transitioned to the bright state, and the method 1000 may include performing multiple cycles or iterations (see e.g., the diagram 400 in FIG. 4). Each cycle or iteration may be tuned to a particular motional state of the motional states associated with the motional mode, or each cycle or iteration is tuned to a different motional state of the motional states associated with the motional mode to cover a band of motional states.

In another aspect of the method 1000, for the ion in the ion trap, the detection of the population of non-zero motional states may be performed for two or more of the three motional modes associated with the ion.

Figure 11:
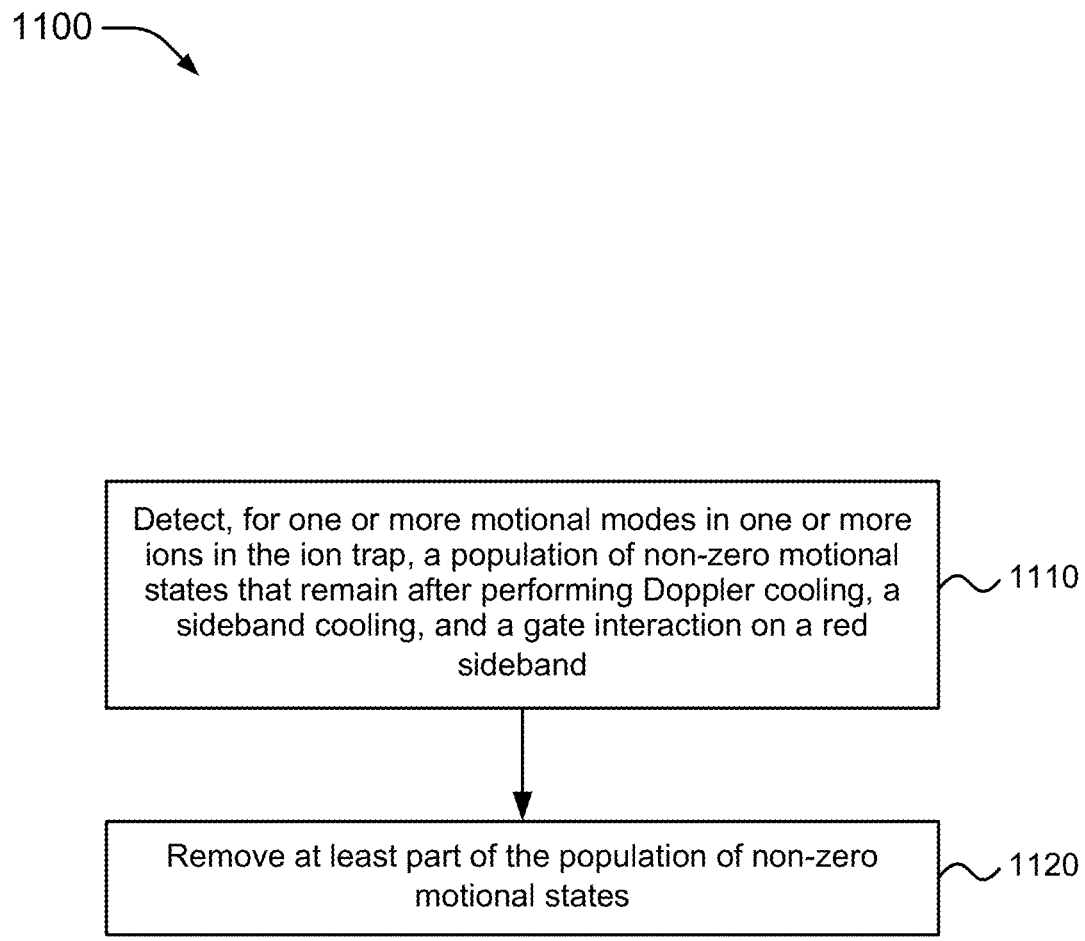

FIG. 11 is a flow diagram that illustrates a method 1100 for cooling motional states in an ion trap (e.g., the ion trap 870) for quantum computers. In an aspect, the functions of the method 1100 may be performed by one or more components of a trapped ion system or a QIP system such as the QIP system 800 and its components (e.g., optical controller 820 and its components or subcomponents). Similarly, the functions of the method 1100 may be performed by one or more components of a computer device such as the computer device 900 and its components.

At 1110, the method 1100 includes detecting, for one or more motional modes in one or more ions in the ion trap, a population of non-zero motional states that remains after performing Doppler cooling, sideband cooling, and a gate interaction on a red sideband.

At 1120, the method 1100 includes removing at least part of the population of non-zero motional states.

Alternatively, 1110 and 1120 respectively include detecting, for one or more motional modes in one or more ions in the ion trap, whether a population of non-zero motional states remains after performing Doppler cooling, sideband cooling, and a gate interaction on a red sideband and removing at least part of the population of non-zero motional states in response to such population being detected.

In an aspect of the method 1100, for one ion in the ion trap, the detection is repeated on two or more of the motional modes of the ion.

In another aspect of the method 1100, for two or more ions in the ion trap, the two or more ions are subject to a common red sideband transition associated with the gate interaction on the red sideband for detecting the population of non-zero motional states for a single motional mode of the ions.

In another aspect of the method 1100, for two or more ions in the ion trap, the two or more ions are individually addressed and a red sideband transition associated with the gate interaction on the red sideband on each ion is tuned for detecting the population of non-zero motional states for a particular motional mode or motional modes.

In another aspect of the method 1100, for two or more ions in the ion trap, only a subset of the two or more ions are subject to a red sideband transition associated with the gate interaction on the red sideband.

In another aspect of the method 1100, two or more ions in the ion trap are different species of ions.

In another aspect of the method 1100, two or more ions in the ion trap are used for detecting the population of non-zero motional states in more than one motional mode.

In another aspect of the method 1100, the method 1100 may further include flagging or identifying data for a quantum computation to indicate that a population of non-zero motional states was detected.

Figure 12:
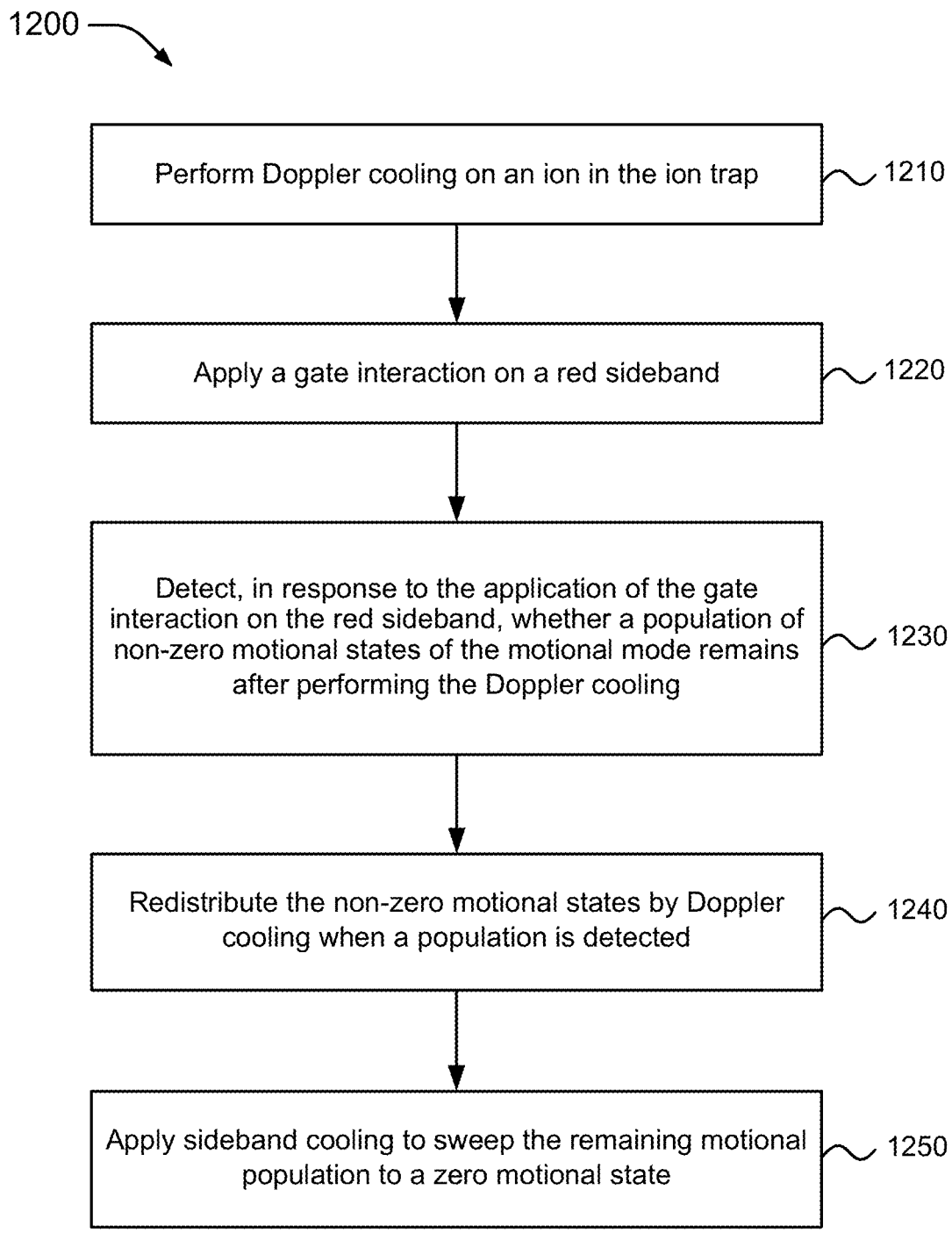

FIG. 12 is a flow diagram that illustrates a method 1200 for cooling motional states in an ion trap for quantum computers. In an aspect, the functions of the method 1200 may be performed by one or more components of a trapped ion system or a QIP system such as the QIP system 800 and its components (e.g., optical controller 820 and its components or subcomponents). Similarly, the functions of the method 1200 may be performed by one or more components of a computer device such as the computer device 900 and its components.

At 1210, the method 1200 includes performing Doppler cooling on an ion in the ion trap.

At 1220, the method 1200 includes applying a gate interaction on a red sideband.

At 1230, the method 1200 includes detecting, in response to the application of the gate interaction on the red sideband, whether a population of non-zero motional states of the motional mode remains after performing the Doppler cooling.

At 1240, the method 1200 includes redistributing the non-zero motional states by Doppler cooling in response to a population of the non-zero motional states being detected.

At 1250, the method 1200 includes applying sideband cooling to sweep the remaining motional population to a zero motional states. Thus, 1240 and 1250 may involve removing at least part of the population of non-zero motional states by repeating the Doppler cooling in 1210 until 1230 does not detect a population of non-zero motional states.

In accordance with the description of FIGS. 1-12, the present disclosure proposes a QIP system (e.g., the QIP system 800) that is configured to cool down one or more motional modes. Such a QIP system includes an ion trap (e.g., the ion trap 870) having one or more ions, an optical controller (e.g., the optical controller 820), an imaging system (e.g., the imaging system 840), and a cool down component (e.g., the cool down component 845 having the high motional states cooling component 846). In one implementation, the cool down component is configured to: perform, using the optical controller, Doppler cooling followed by a sideband cooling to an ion or ions in the ion trap to sweep motional states associated with a motional mode to a zero motional state; apply, using the optical controller, a gate interaction on a red sideband; detect, using the imaging system, in response to the application of the gate interaction on the red sideband, a population of non-zero motional states of the motional mode that remains after performing the Doppler cooling followed by the sideband cooling; and remove, using the optical controller, at least part of the population of non-zero motional states.

In another implementation, the cool down component is configured to: perform, using the optical controller, Doppler cooling on an ion or ions in the ion trap; apply, using the optical controller, a gate interaction on a red sideband; detect, using the imaging system, in response to the application of the gate interaction on the red sideband, a population of non-zero motional states of the motional mode that remains after performing the Doppler cooling; and remove, using the optical controller, at least part of the population of non-zero motional states by applying a sideband cooling to sweep at least a portion of non-zero motional states to a zero motional state.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for cooling motional states in an ion trap for quantum computers, comprising:
    performing a first cooling followed by a second cooling to an ion in the ion trap to sweep population of non-zero motional states associated with a motional mode to a zero motional state;
    applying a gate interaction on a red sideband;
    detecting, in response to the application of the gate interaction on the red sideband, a population of non-zero motional states of the motional mode that remains after performing the first cooling followed by the second cooling; and
    removing at least part of the population of non-zero motional states.

2. The method of claim 1, wherein the non-zero motional states include motional states with a motional mode number $n \geq 10$, $n \geq 20$, $n \geq 30$, $n \geq 40$, or $n \geq 50$.

3. The method of claim 1, wherein the first cooling is a Doppler cooling and the second cooling is a sideband cooling.

4. The method of claim 3, further comprising:
    pumping the ion into a dark state after performing the Doppler cooling followed by the sideband cooling,
    wherein detecting the population of non-zero motional states of the motional mode includes detecting whether the ion remains in the dark state or transitioned to a bright state in response to the application of the gate interaction on the red sideband.

5. The method of claim 4, further comprising:
    proceeding to a quantum computation in response to the dark state being detected, otherwise proceeding back to subsequent Doppler cooling followed by a subsequent sideband cooling in response to the bright state being detected.

6. The method of claim 5, further comprising:
    in response to the dark state being detected, determining a probability that the ion is in a high thermal state; and
    proceeding back to the pumping of the ion into the dark state in response to the probability being greater than a threshold, otherwise proceeding to use the ion in the quantum operation.

7. The method of claim 6, wherein proceeding to use the ion in the quantum operation includes pumping the ion into the dark state prior to being used in the quantum operation.

8. The method of claim 4, wherein a cycle or iteration includes the Doppler cooling and the sideband cooling, the pumping the ion into a dark state, the applying the gate interaction on the red sideband, and the detecting whether the ion remains in the dark state or transitioned to the bright state, and wherein the method includes performing multiple cycles or iterations.

9. The method of claim 8, wherein each cycle or iteration is tuned to a particular motional state of the motional states associated with the motional mode, or each cycle or iteration is tuned to a different motional state of the motional states associated with the motional mode to cover a band of motional states.

10. The method of claim 1, wherein for the ion in the ion trap, the detection of the population of non-zero motional states is performed for two or more of the three motional modes associated with the ion.

11. A method for cooling motional states in an ion trap for quantum computers, comprising:
 detecting, for one or more motional modes in one or more ions in the ion trap, a population of non-zero motional states that remain after performing a Doppler cooling, a sideband cooling, and a gate interaction on a red sideband; and
 removing at least part of the population of non-zero motional states.

12. The method of claim 11, wherein for one ion in the ion trap the detection is repeated on two or more of the motional modes of the ion.

13. The method of claim 11, wherein for two or more ions in the ion trap the two or more ions are subject to a common red sideband transition associated with the gate interaction on the red sideband for detecting the population of non-zero motional states for a single motional mode of the ions.

14. The method of claim 11, wherein for two or more ions in the ion trap the two or more ions are individually addressed and a red sideband transition associated with the gate interaction on the red sideband on each ion is tuned for detecting the population of non-zero motional states for a particular motional mode or motional modes.

15. The method of claim 11, wherein for two or more ions in the ion trap only a subset of the two or more ions are subject to a red sideband transition associated with the gate interaction on the red sideband.

16. The method of claim 11, wherein two or more ions in the ion trap are different species of ions.

17. The method of claim 11, wherein two or more ions in the ion trap are used for detecting the population of non-zero motional states in more than one motional mode.

18. The method of claim 11, further comprising flagging data for a quantum computation to indicate that a population of non-zero motional states was detected.

19. A method for cooling motional states in an ion trap for quantum computers, comprising:
 performing a Doppler cooling on an ion in the ion trap;
 applying a gate interaction on a red sideband; and
 detecting, in response to the application of the gate interaction on the red sideband, whether a population of non-zero motional states of the motional mode remains after performing the Doppler cooling;
 redistributing the non-zero motional states by a subsequent Doppler cooling in response to a population of the non-zero motional states being detected; and
 applying sideband cooling to sweep the remaining population to a zero motional state.

20. A quantum information processing (QIP) system for cooling down one or more motional modes, comprising:
 an ion trap having one or more ions;
 an optical controller;
 an imaging system; and
 a cool down component configured to:
  perform, using the optical controller, a Doppler cooling followed by a sideband cooling to an ion in the ion trap to sweep population of motional states associated with a motional mode to a zero motional state;
  apply, using the optical controller, a gate interaction on a red sideband;
  detect, using the imaging system, in response to the application of the gate interaction on the red sideband, a population of non-zero motional states of the motional mode that remains after performing the Doppler cooling followed by the sideband cooling; and
  remove, using the optical controller, at least part of the population of non-zero motional states.

* * * * *